No. 687,259. Patented Nov. 26, 1901.
F. R. PACKHAM & G. P. OATES.
DISK HARROW.
(Application filed Aug. 23, 1900.)
(No Model.) 2 Sheets—Sheet 1.

WITNESSES:
Frank L. Walker
Edmond J. Ogden

INVENTORS:
Frank R. Packham
George P. Oates
BY
Paul A. ——
ATTORNEY.

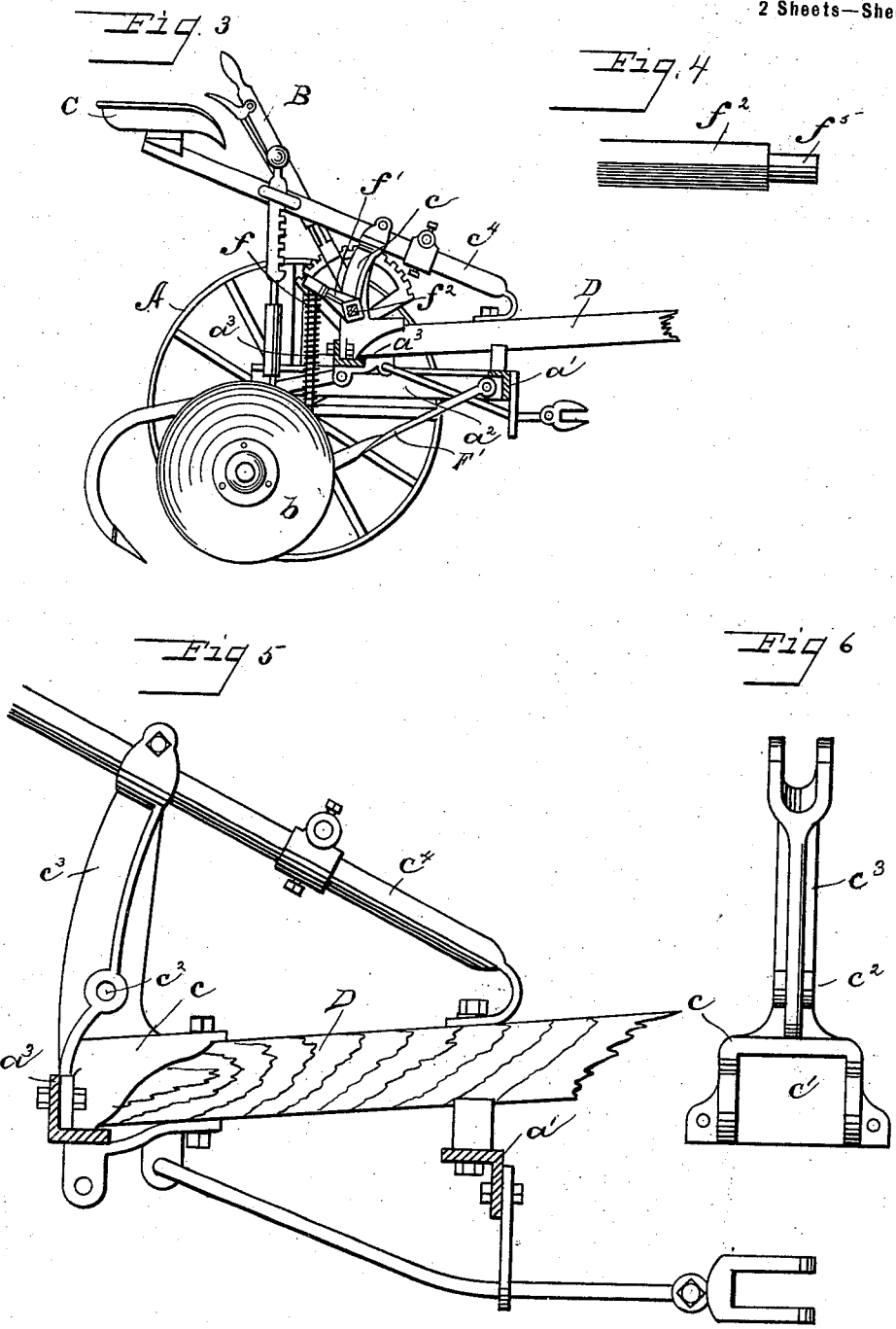

United States Patent Office.

FRANK R. PACKHAM AND GEORGE P. OATES, OF SPRINGFIELD, OHIO, ASSIGNORS TO THE SUPERIOR DRILL COMPANY, OF SPRINGFIELD, OHIO, A CORPORATION OF OHIO.

DISK HARROW.

SPECIFICATION forming part of Letters Patent No. 687,259, dated November 26, 1901.

Application filed August 23, 1900. Serial No. 27,830. (No model.)

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Disk Harrows, of which the following is a specification.

Our invention relates to improvements in disk harrows, and especially relates to improvements in the type of disk harrow shown in our former patent, No. 628,028, dated July 4, 1899, in which are employed independent drag-bars, each carrying a disk, the whole framework being supported by ground-wheels.

One object of our invention is to provide an improved framework which dispenses with the rear truss-rail of the frame, thereby cheapening its construction and increasing its efficiency.

A further object of our invention is to provide a novel and improved form of seat and tongue support and bearings for the rock-shaft journals which carry the depressing-arms, all made integral and performing the several functions referred to.

A further object of our invention is to provide an improved form of support at the rear end of the drag-bar which carries the disk in its bearings.

Our invention consists in the constructions and combinations of parts hereinafter described, and pointed out in the claims.

Figure 1:
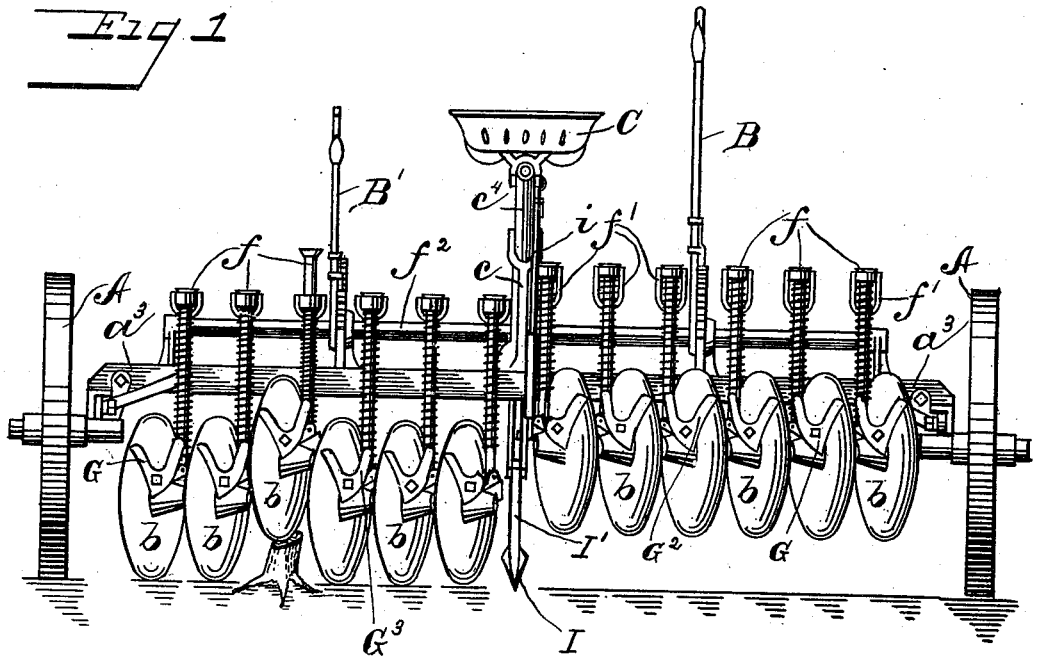
Figure 2:
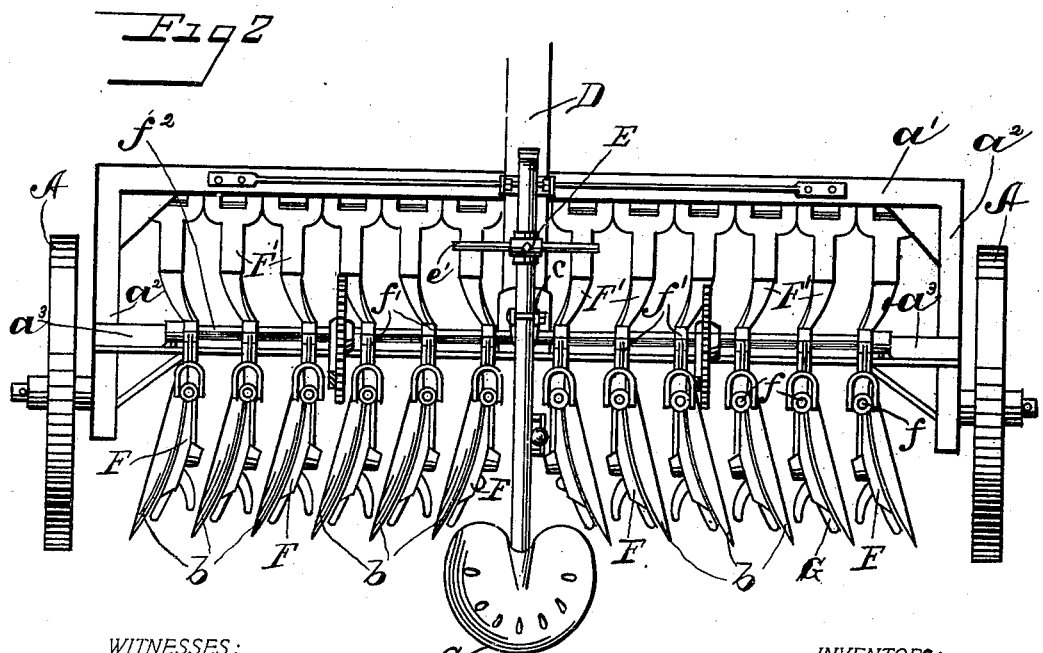

In the accompanying drawings, Figure 1 is a rear elevation of our improved device, showing one half the disks elevated for transportation and the other half lowered to their working position on the ground, one of the latter disks being shown passing an obstruction. Fig. 2 is a plan view of the device. Fig. 3 is a vertical sectional view thereof. Fig. 4 is a detail view of one end of the rock-shaft. Fig. 5 is a side elevation and section through the center of the device, showing the seat-support with adjustable foot-rest attached thereto, together with the tongue-support and adjustable hitch. Fig. 6 is a front elevation of the main seat-support casting.

Like parts are represented by similar letters of reference in the several views.

In the said drawings, A represents the supporting ground or gage wheels, which run freely upon gudgeons connected to the main frame of the machine. The main frame preferably consists of a single angle-iron, one portion $a'$ of which extends across the front of the machine, with side portions $a^2$ extending a short distance beyond the center of the carrying-wheels A and forming the support therefor. These side portions $a^2$ are connected by a bed-rail $a^3$, upon which some of the operating parts of the machine are supported. By constructing the frame in this manner it will be seen that the rear rail of the frame shown in our former patent is dispensed with, thereby cheapening the construction of the harrow and enabling it to perform better work, for the reason that the close proximity of the rear rail previously employed to the periphery of the disks had a great tendency to hold the clods at such times as when the disks were raised in a vertical direction, as in passing over an obstruction, for instance. By omitting this rear rail we are enabled to shorten the side rails, as shown, and thus obviate the use of the shields shown in our former patent, and thereby further cheapen the construction of the machine.

The cultivating-disks $b$ are each mounted on a suitable support F, which is connected to the end of a drag-bar F', pivotally connected to the front portion of the frame. Connected to each of these disk supports is a lifting and pressure rod $f$, pivoted at its upper end to a presser-arm $f'$, which presser-arms are connected to rock-shafts $f^2$, which rock-shafts are supported at each end in suitable supports on the bed-rail, raising and lowering levers B B' being connected to said rock-shaft for lifting and depressing the disks, said pressure-rods being each provided with a spring to exert pressure upon the disks in the usual manner.

Secured to the center of the bed-rail is a supporting-casting $c$, the lower portion of which is recessed or formed with a pocket $c'$ to receive the end of the tongue D and is also provided with a journal $c^2$ for the ends $f^5$ of the rock-shafts. This supporting-casting c is also provided with an upwardly-extending portion $c^3$, preferably with a bifurcated end to form a support for an angularly-extending tubular seat-support $c^4$, adapted to support a seat C, the lower end of said tubular support being secured to the tongue D, as shown in Figs. 3, 5, and 6, said seat C being preferably made adjustable up and down on said support $c^4$.

Having thus described our invention, we claim—

1. In a harrow, a supporting-frame provided with two carrying-wheels, independent cultivating devices pivotally connected to the said frame and adapted to be controlled by means of levers, said frame consisting of a front portion and side rails, said side rails terminating substantially at the axial center of the carrying-wheels, substantially as specified.

2. In a disk harrow, a supporting-frame, carrying-wheels journaled to said frame and cultivating-disks also pivotally connected to said frame, said frame consisting of a front portion and side rails terminating at a point substantially at or slightly beyond the center of the carrying-wheels, a bed-rail located on said side rails and to the rear of the front rail of the frame, and means supported on said bed-rail for raising and lowering the cultivating-disks, substantially as specified.

3. In a disk harrow, a supporting-frame consisting of a front and side rails, supporting-wheels journaled to the side rails substantially at the ends thereof, a bed-rail located on said side rails between said front rail and supporting-wheels, independent cultivating-disks pivotally attached to the front portion of the frame, means located on said bed-rail for controlling said cultivating-disks and a seat-support also located on said bed-rail, substantially as specified.

4. In a disk harrow, a supporting-frame consisting of front and side rails, independent cultivating-disks pivotally connected to said frame, carrying-wheels journaled to the said side rails near the ends thereof, a bed-rail supported on the said side rails and a supporting-casting secured to said bed-rail, means supported on said bed-rail for controlling said disks consisting in part of a rock shaft or shafts, bearings in said supporting-casting for said rock shaft or shafts, a recess or pocket formed in said supporting-casting for the reception of the tongue of the machine, and a seat-support also supported on said casting, substantially as specified.

5. In a disk harrow, a frame mounted upon carrying and gaging wheels, the side rails of said frame terminating substantially at the axial center of said carrying-wheels, a bed-rail extending laterally across said frame, disks pivotally connected to said frame and means located on said bed-rail for controlling said disks, a supporting-casting located on said bed-rail having a bifurcated upper portion for the reception of a tubular seat-support, bearings in said supporting-casting for rock-shafts, which form a part of the disk-controlling means, and a lower recessed or boxed portion in the supporting-casting for the reception of the tongue of the machine, substantially as specified.

In testimony whereof we have hereunto set our hands this 17th day of August, A. D. 1900.

FRANK R. PACKHAM.
GEORGE P. OATES.

Witnesses:
EDWARD L. BEECHWALTER,
CHAS. I. WELCH.